United States Patent [19]

Scott et al.

[11] 4,035,158

[45] July 12, 1977

[54] PROCESS AND APPARATUS FOR BURNING HYDROGEN SULFIDE AND OTHER COMBUSTIBLE FLUID TO RECOVER SULFUR

[75] Inventors: Gerald W. Scott, Tulsa; Eugene C. McGill, Skiatook, both of Okla.

[73] Assignee: John Zink Company, Tulsa, Okla.

[21] Appl. No.: 571,525

[22] Filed: Apr. 25, 1975

[51] Int. Cl.² .............. B01J 1/00; C01B 17/04; F23C 5/00
[52] U.S. Cl. .............. 23/278; 23/277 R; 423/573 G; 431/175; 431/283; 431/284
[58] Field of Search ........... 23/277 R, 278, 262; 423/573; 431/187, 283, 284, 285

[56] References Cited

U.S. PATENT DOCUMENTS

| 2,103,605 | 12/1937 | Zink | 431/187 X |
| 2,659,662 | 11/1953 | Heller | 23/277 R X |
| 2,822,864 | 2/1958 | Black | 431/284 X |
| 3,649,206 | 3/1972 | Ivernel | 431/187 X |
| 3,661,534 | 5/1972 | Reed | 431/187 X |
| 3,782,884 | 1/1974 | Shumaker | 431/187 X |
| 3,877,879 | 4/1975 | Palm et al. | 23/262 |
| 3,897,200 | 7/1975 | Childree | 431/285 X |

Primary Examiner—Joseph Scovronek
Assistant Examiner—Roger F. Phillips
Attorney, Agent, or Firm—Head, Johnson & Chafin

[57] ABSTRACT

A method and apparatus of combusting an acid gas ($H_2S$) stream and a second stream containing an organic sulfur compound which may be contaminated with ammonia, and/or hydrocarbons, either liquid or gaseous, to create $SO_2$ and $H_2S$ for ultimate recovery of sulfur.

6 Claims, 6 Drawing Figures

PROCESS AND APPARATUS FOR BURNING HYDROGEN SULFIDE AND OTHER COMBUSTIBLE FLUID TO RECOVER SULFUR

CROSS REFERENCE TO RELATED APPLICATIONS

This Application is related to an Application of Robert D. Reed, Ser. No. 502,156, filed Aug. 30, 1974, now abandoned, entitled "Hydrogen Sulfide Burner" and owned by a common assignee.

BACKGROUND

In the prior art, sour gas streams, that is, hydrogen sulfide streams have been processed by the well known Claus process which initially burn approximately ⅓ of the hydrogen sulfide, then is further processed to obtain free sulfur.

This invention relates to reactions for the conversion of hydrogen sulfide to free sulfur where larger amounts of an organic sulfur compound which may be contaminated with ammonia, and/or hydrocarbons, either liquid or gaseous, are present. Conventional Claus reaction processes are limited to gaseous hydrogen sulfide and air with only trace amounts of gaseous hydrocarbons.

There are many refineries or process areas having fixed streams of $H_2S$ and for example $NH_3$ mixed with $H_2S$. The $NH_3$, if introduced into the usual Claus reaction and sulfur recovery process, would not be burned to completion. That is, if the dual streams were injected into the standard Claus reaction where burning occurs in presence of ⅓ air, the air will burn selectively the $H_2S$ and leave some unburned $NH_3$. $NH_3$ could react and plug the catalytic converter beds used to form free molten sulfur. To separate the $NH_3$ and flare it separately poses environmental and energy wasting problems.

SUMMARY OF THE INVENTION

It is the primary object of this Invention to provide a method and apparatus which can be used for the reactions of hydrogen sulfide with air and an organic sulfur compound which may be contaminated with ammonia and/or hydrocarbons, either liquid or gaseous, for feeding a sulfur recovery process.

These and other objects are realized in this Invention by first burning a portion of a stream of hydrogen sulfide in a central burner, in an opening in a first insulated combustion chamber of a reactor. In the annulus between the central and gas burner and the opening, a stream of an organic sulfur compound which may be contaminated with ammonia and/or hydrocarbons either liquid or gaseous is burned through a single or plurality of separate nozzles. The hot products of combustion containing substantially stoichiometric oxygen and an excess of oxygen pass through the reactor after an initial retention time sufficient to make the resultant gases free of any or substantially all of ammonia and/or organic compounds either liquid or gaseous. At the junction between the first and second chambers of the reactor, the remaining volume of the hydrogen sulfide is introduced through a single or plurality of nozzles through the wall of the reactor. The hydrogen sulfide mixes with the hot reaction gases from the first chamber and the resulting products are suitable for further processing to obtain free sulfur.

BRIEF DESCRIPTION OF THE DRAWINGS

These and other objects and advantages of this Invention and a better understanding of the principles and details of the Invention will be evident from the following description taken in conjunction with the appended drawings in which.

DESCRIPTION OF THE PREFERRED EMBODIMENTS

Figure 1:
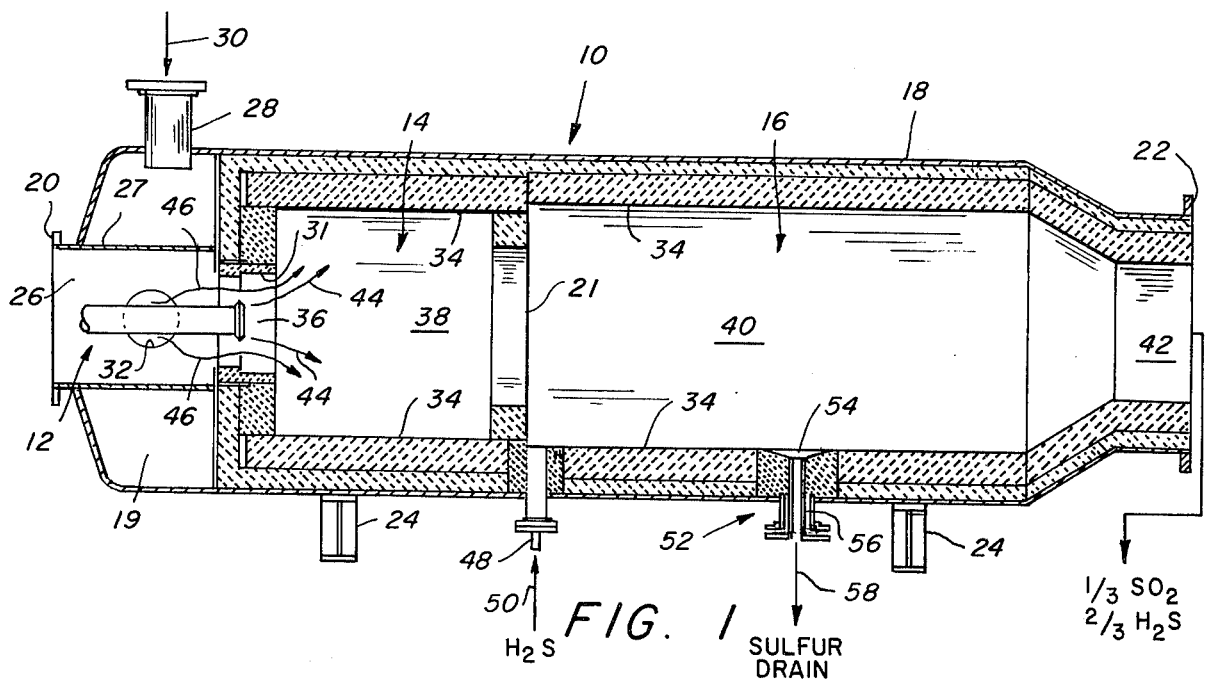
FIG. 1 illustrates in cross-section one embodiment of an apparatus.
Figure 2:
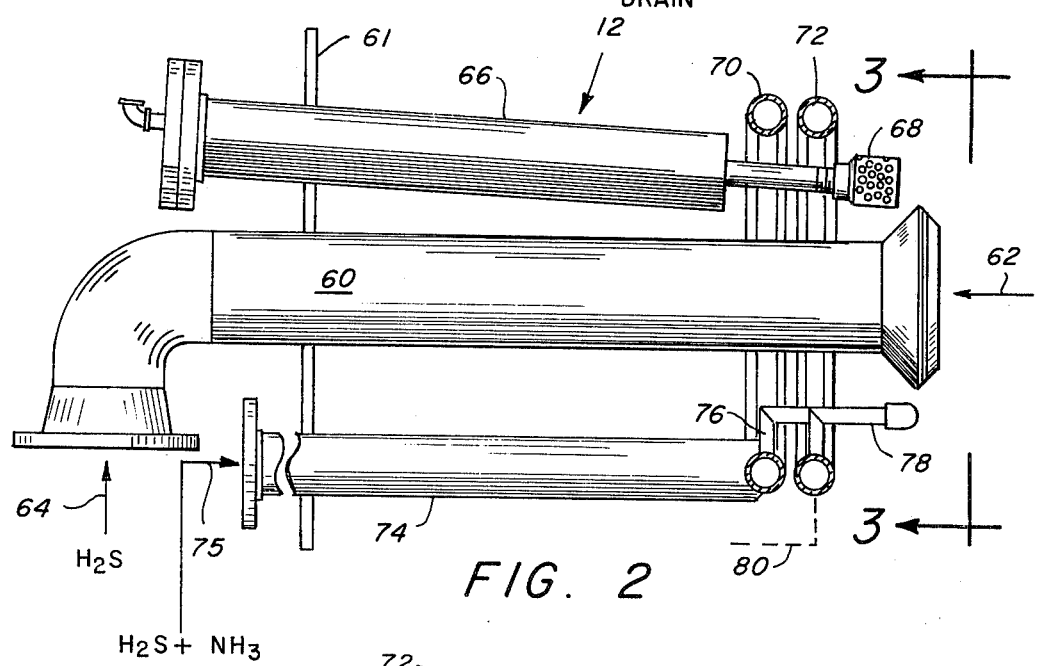
FIGS. 2 and 3 provide specific details of a burner arrangement at the inlet end of the reactor.
Figure 3:
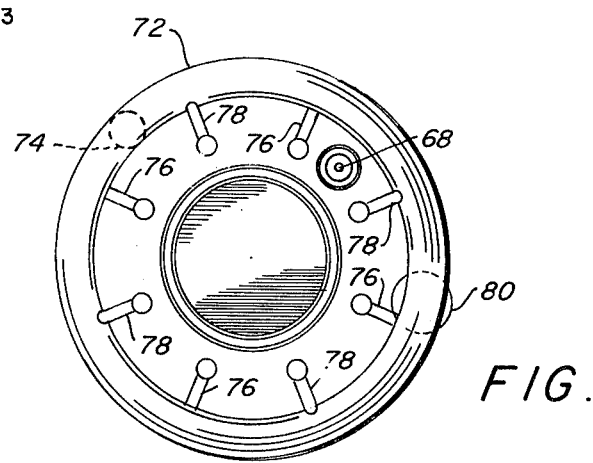

Referring now to the drawings and in particular to FIG. 1, there is shown in a cross-section one embodiment of the reactor, indicated generally by the numeral 10. The burner assembly is shown in outline at the inlet (left) end of the reactor and is indicated generally by the numeral 12 of which FIGS. 2 and 3 show greater detail. A first combustion chamber of the reactor is indicated generally by the numeral 14, and the second reaction chamber is indicated generally by the numeral 16.

Figure 6:
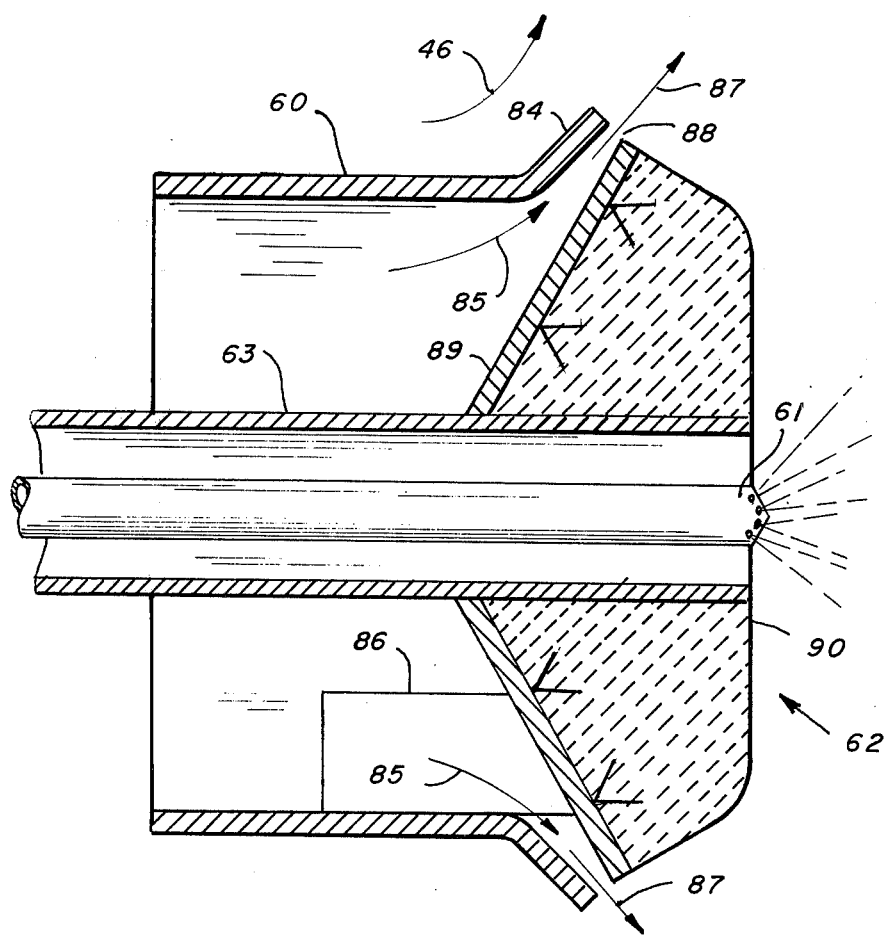
FIG. 6 is another embodiment of the burner of this Invention.

The reactor typically is a cylindrical metal housing 18 with the gas inlet portion at the left end, at flange 20, and the outlet indicated by the flange 22 at the right end. The reactor combines in one self-contained apparatus the combustion space 14, into which at one end is introduced a portion (e.g., 10–35%) of a hydrogen sulfide gas stream through a central burner and 100% of an organic sulfur compound which may be contaminated with ammonia and/or hydrocarbons through a single or plurality of nozzles (see FIG. 2) in the annulus between the hydrogen sulfide burner tip and the burner tile opening. A liquid stream containing an organic sulfur compound which may be contaminated with of ammonia and/or hydrocarbons can be injected through a single nozzle to the center of the central burner 60 as shown in FIG. 6. The ignited fluids first react in space 14 with substantially stoichiometric oxygen and an excess of oxygen. As will be described in connection with FIGS. 2 and 3, additional burners in the annulus are provided for the combustion of fuel gas. The burner assembly is mounted on a flange 20 at the inlet end of the reactor 10.

The burner opening is a cylindrical tube 27 having an opening 36 formed of heat resistant tile into which the burner assembly is inserted, and supported on the flange 20. There is an annular plenum chamber 19 surrounding the tube 27 with an air inlet pipe 28. Air is introduced into the plenum in accordance with the arrow 30. The reactants are under pressure above atmospheric because of pressure losses in the reactor, the waste heat boiler and other downstream equipment.

Air from the plenum 19 enters through a plurality of openings 32 in the cylinder 27 and flows into the combustion chamber through the annulus between the burner 12 and the burner tile opening 36 at the left end of the combustion space 14. The air, hydrogen sulfide and an organic sulfur compound which may be contaminated with ammonia and/or hydrocarbons mix and rapidly react to provide a hot gaseous atmosphere in the space 14 in the first chamber. These hot flue gases pass on through the interface 21 between the first chamber 14 and the second chamber 16.

Downstream of the interface 21 is a nozzle or nozzles 48 which inject the remaining portion of the hydrogen sulfide gas stream. This gas is rapidly heated and partially reacted by the hot products of combustion from the first chamber 14 to form a resultant stream suitable for feeding a sulfur recovery process. The retention time in the second chamber 16 is sufficient to make the resultant gases satisfactory for feeding to the usual conversion processes of sulfur recovery. These vapors and gases are then passed through a typical waste heat boiler and a Claus reaction process well known in the art. See, for example, Hydrocarbon Processing Vol. 47 No 9 pages 248-252 September 1968, for a description of various Claus processes.

Other practical features of reactors of this type such as sight glasses and weather protection means and appropriate types of thermal insulation, etc., are provided, but are not described in detail, since they are well known in the art and their particular type forms no part of this Invention.

Referring now to FIG. 2 there is shown one embodiment of the burner assembly indicated generally by the numeral 12. This comprises a plate 61 which is adapted to be fitted to, and supported on the flange 20 of the reactor. This carries a central pipe 60 through which hydrogen sulfide is supplied as indicated by the arrow 64. At the downstream end of this pipe is a burner indicated generally by the numeral 62, which will be described in detail in conjunction with FIGS. 4 and 5. This burner is mounted axially in the opening 36 in the brick wall of the first chamber 14 of the reactor. If the reactant is liquid a central nozzle X should be installed.

At the outlet of the burner, as will be explained in conjunction with FIGS. 4 and 5, the hydrogen sulfide passes out of the burner 62 in the form of a series of individual streams or as a thin sheet of hydrogen sulfide at high velocity in the form of a spreading conical sheet. Air, under pressure as indicated by the arrows 46, passes in the annulus along the stream of hydrogen sulfide 44 so that there is turbulent and rapid mixing and burning of the hydrogen sulfide.

In the annulus between the central burner 62 and the face 31 of the opening 36, there is a plurality of individual nozzles 76 and 78 (only two shown), which are connected respectively to two circular manifolds 70 and 72. One of these manifolds is connected to a supply of an organic sulfur compound which may be contaminated with ammonia and/or hydrocarbons which, for example, could be introduced through a pipe 74 in accordance with the arrow 75. The nozzles are supported on pipes equally spaced around the periphery. The second manifold 72 might be supplied with fuel gas through means indicated generally by the dashed line 80. Connected to this second manifold are a plurality of nozzles 78 which are positioned alternately between the nozzles 76 as shown in FIG. 3. In addition there is a pilot burner 68 which is supported by a pipe means 66, for initially igniting the fuel nozzles.

Figure 4:
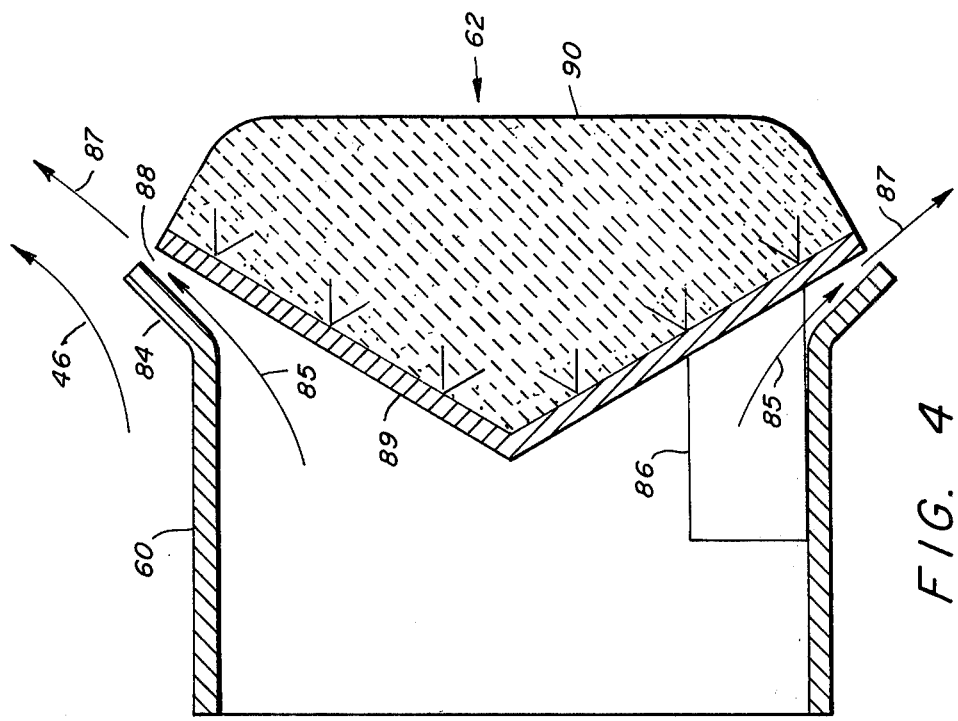
FIGS. 4 and 5 show two different embodiments of the gas distribution in the hydrogen sulfide burner.
Figure 5:
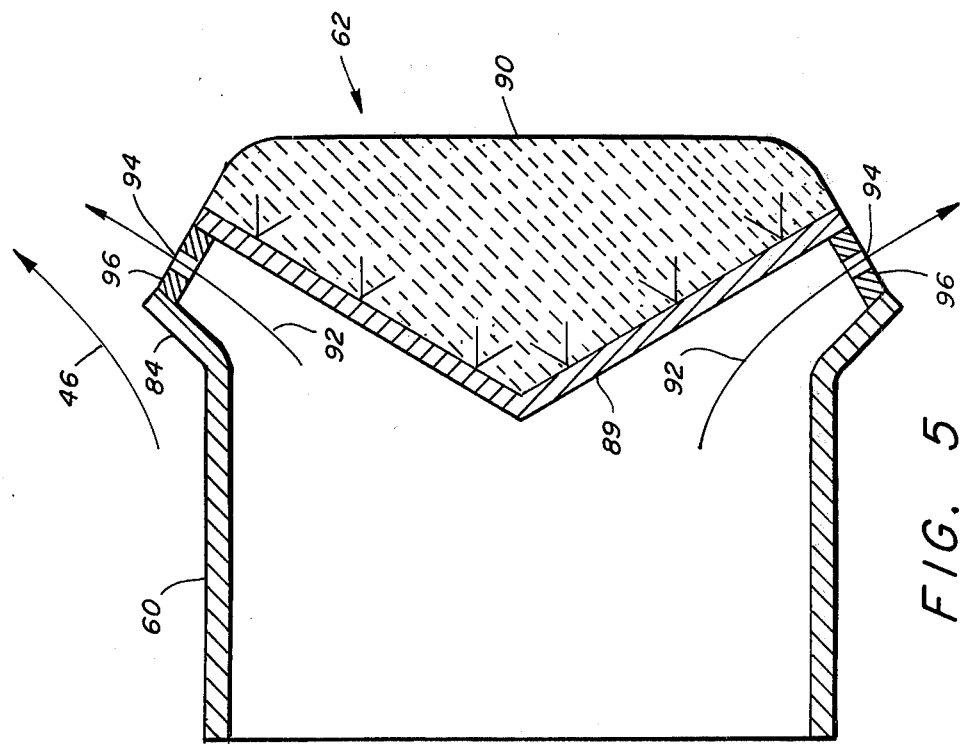

Referring now to FIGS. 4 and 5 there are shown two embodiments of a burner tip indicated generally by the numeral 62, for the introduction of hydrogen sulfide into the first chamber 14.

The pipe 60 has an outwardly expanding conical portion 84. The end of the pipe is closed by a conical plate 89 which is a diverter, for diverting the stream of hydrogen sulfide into the annular space 88 about the periphery of the spreader 89. The hydrogen sulfide flows in accordance with the arrows 85 and 87, in the form of a conical sheet of high velocity gas, or as a plurality of individual streams lying along a conical surface. The diverter 89 is supported to the pipe 60 by means of a plurality of rods 86 which may be circular or rectangular in cross-section. Reference is made to the copending U.S. Pat. application Ser. No, 502,156 for further details of a burner useful in this process.

Insulating material 90 is generally provided over the front face of the diverter in order to protect it from the intense heat of the flame in the chamber 14.

When the flow of hydrogen sulfide is relatively large and a large opening is required, the annular opening 88 shown in FIG. 4 is utilized. When the flow of hydrogen sulfide is small, an improved method of construction of the burner tip is as shown in FIG. 5. Here the diverter is supported to the flange 84 by means of a spacer strip 96 with a plurality of openings 94 spaced circumferentially about the burner tip. The hydrogen sulfide flows in accordance with arrows 92 through these openings in the form of a plurality of jets of high velocity hydrogen sulfide in a general expanding conical wall. Where the flow is such that a very large number of openings is required to provide a minimum pressure drop across these openings, then the annular type of openings shown in FIG. 4 is to be preferred. Any spacing of the annular gap 88 can be provided by positioning the rods 86 in anticipation of the desired gas flow. Other embodiments, as shown in the referenced application Ser. No. 502,156, can be utilized for supporting the diverter on a central rod-like means and adjusting the longitudinal position of the diverter, to adjust the length of the gap 88, as desired, to accommodate different magnitudes of hydrogen sulfide flow.

Fuel gas is supplied to the peripheral burners in the annular space around the hydrogen sulfide burner for the purposes of preheat of the reactor at startup time or for supplemental heat in burning lean acid gas streams. Because the operation of the reactor to accomplish minimum pollutants in the atmosphere, and maximum recovery of sulfur, require critical temperature maintenance inside of the chambers, it is important that in starting up, the reactor be warmed to the proper temperature with a fuel.

A typical example of a process using a reactor of the type shown would be provided with acid gas of a total of 187 mols per hour. Of this, approximately 30% or 49 mols per hour would go into the central hydrogen sulfide burner 60 and the remaining 138 mols per hour would flow through the circumferential nozzles 48 at the interface 21. A gas containing ammonia, of which there are 23 mols per hour, would flow through one manifold 70 and set of four (for example) nozzles 76. A total of 447 mols per hour of combustion air would be required. A temperature of about 3000° F and retention time of 0.33 second would be present in the first chamber 14 and a temperature of about 2500° F and retention time of 0.67 second would be present in the second chamber 16.

Although in the example given the total retention time was one (1) second in the reactor this is by way of example only and not limiting. The retention time is typically divided: ⅓ in the first chamber and ⅔ in the second chamber. This is variable, however, depending upon the characteristics of the contaminating fluid stream which needs to be completely burned in the first chamber.

This design may be employed for burning liquid sulfur-bearing compounds. Liquid sulfur-bearing compounds will be injected through nozzle 61 located in the center of the hydrogen sulfide burner 62. The liquid will be atomized into combustion air stream 46 and will be ignited by hydrogen sulfide gas injected in burner 60 and mixed with air stream 46 as generally shown in FIG. 1 by line 44.

The remaining volume of hydrogen sulfide stream is injected at the interface into the second chamber.

While the Invention has been described with a certain degree of particularity, it is manifest that many changes may be made in the details of construction and the arrangement of components. It is understood that the Invention is not to be limited to the specific embodiments set forth herein by way of exemplifying the Invention, but the Invention is to be limited only by the scope of the attached claim or claims, including the full range of equivalency to which each element or step thereof is entitled.

What is claimed is:

1. Apparatus for burning a first hydrogen sulfide fluid stream and a second organic sulfur fluid stream into a product suitable for recovery of free sulfur therefrom, comprising:
   a. a reactor housing means comprising an internally insulated cylindrical chamber of substantially constant diameter having an annular wall partially closing an inlet end, and an outlet end, a selected portion of the interior space downstream of said inlet end defining a combustion section, and the remaining portion downstream thereof of said chamber defining a reaction section;
   b. first burner means positioned axially through a central opening at said inlet end, providing an annular space between said first burner means and said central opening, and means to pass a selected smaller portion of said first hydrogen sulfide stream through said first burner means;
   c. a second burner means positioned in the said annular space and means to supply all of said second fluid stream through said second burner means;
   d. air inlet and plenum means for providing combustion air through said annular space; and
   e. plural injection means to the interior of said reactor at about the downstream junction between said combustion space and said reaction space, said injection means spaced circumferentially about said housing, and means for injecting the remaining portion of said first hydrogen sulfide stream through said injection means.

2. The reactor system of claim 1 including a plurality of second burner means circumferentially spaced in said annular space.

3. The reactor system as in claim 1 including a plurality of separate fuel gas burners circumferentially spaced in said annular space.

4. The reactor system as in claim 1 including means in said annular space to ignite said fluid streams.

5. The reactor system as in claim 1 in which said selected smaller portion is approximately 30% of said first hydrogen sulfide stream.

6. The apparatus of claim 1 including a wall separating said combustion and reaction sections, having an outlet orifice of smaller diameter than the interior of said chamber, said wall positioned immediately upstream of said plural injection means.

* * * * *